United States Patent

[11] 3,573,738

| [72] | Inventors | David M. Bottles<br>West Los Angeles;<br>Royal H. Daw, Sherman Oaks; Jack<br>Rosenberg, Pacific Palisades, Calif. |
|---|---|---|
| [21] | Appl. No. | 697,849 |
| [22] | Filed | Jan. 15, 1968 |
| [45] | Patented | Apr. 6, 1971 |
| [73] | Assignee | International Business Machines<br>Corporation<br>Armonk, N.Y. |

[54] DEMAND COMPUTER SYSTEM FOR MACHINE TOOL CONTROL
9 Claims, 2 Drawing Figs.

| [52] | U.S. Cl. | 340/172.5, 235/151.11 |
|---|---|---|
| [51] | Int. Cl. | G05b 19/18, G06f 15/46 |
| [50] | Field of Search | 235/157, 151.11; 340/172.5; 318/20. |

[56] References Cited
UNITED STATES PATENTS

| 3,375,354 | 3/1968 | McGarrell | 235/151.11 |
| 3,390,315 | 6/1968 | McDonough et al. | 235/151.11X |
| 3,286,085 | 11/1966 | Rado | 340/172.5X |

Primary Examiner—Paul J. Henon
Assistant Examiner—Melvin B. Chapnick
Attorneys—Hanifin and Jancin and John L. Jackson

ABSTRACT: A system for controlling a machine tool or other precise mechanism having a number of slides in which system a sequence of command words for moving each of the slides during the cutting of a segment is calculated and stored in a core storage unit and gated out from core under control of an external demand oscillator to the servosystem of the associated machine tool.

INVENTORS.
DAVID M. BOTTLES
ROYAL H. DAW
JACK ROSENBERG

BY John L Jackson
ATTORNEY

DEMAND COMPUTER SYSTEM FOR MACHINE TOOL CONTROL

BACKGROUND OF INVENTION

1. Field of Invention

This invention relates to the control of machine tools or other precise mechanisms in general and, more particularly, to a computer system for controlling a machine tool or multiple machine tools in a real time mode.

2. Description of Prior Art

In a typical machine tool control configuration a director which is essentially a special purpose digital computer with a fixed program is used. Information stored on a punched tape consisting of instructions to the director for control of vector feedrate and the displacement to be produced simultaneously during the interpolation operation by the director for each axis to be controlled is input to the director from, for instance, an APT (Automatic Programmed tool) processor. One machining interval or segment is defined by one block of tape data.

For optimum control of the machining process, each servomechanism which must be coordinated during the cutting interval requires that it be fed data continuously, the data for each axis servo being coordinated or synchronized with the other axis servos involved in the cutting. The interpolation process consists of the generation of simultaneous coordinated command data for the machine servomechanisms, and is performed by the director which produces incremental digital pulse trains, with as many outputs as there are slides to be controlled. As far as possible, the pulses for a single axis servo are spaced uniformly in time, providing periodic commands for smooth servo action.

A comparator or error register for each axis servo is used. The comparator or error register receives incremental data from the director continuously and provides a difference signal representing instantaneous error between the actual position and commanded position of a slide continuously and at a high comparison rate. Sometimes a reversible digital counter is used; however, more often a command phase counting system is used. In a command phase counting system, a sensing mechanism is used to provide an indication of the position of the machine tool as the machine tool responds to the command signals. The sensing mechanism generates a pulse train the phase of which relative to a reference phase is representative of the actual position of the machine tool. The phase of the command position signal is compared with the phase of the actual position signal, and an error signal directly proportional to the phase difference is generated to provide feedback control in the feedback loop of the servomechanism. The magnitude of the error signal and its sense or polarity (determined by whether the phase of the command signal leads or lags that of the actual position signal) causes the machine tool to move in such a direction as to tend to reduce the magnitude of the error signal.

Several problems are attendant the use of directors to control machine tools. Not only are they expensive, in that normally a director can only control a single machine tool unless duplicate parts are being cut, but additionally, they are of limited flexibility. Thus, for instance, once the punched tape input is prepared for a director for a given tool size, the director using that tape ordinarily cannot effect control over the machine tool with a different size cutting tool. Instead, the control program must be recalculated by the APT processor and a new tape prepared. Additionally, when using a director there is no opportunity to modify the control during the cutting of a segment to take into consideration variables which may occur in the cutting process which may ideally demand that changes in feedrate, coolant, etc. be made. When a director is utilized normally, the only type of override or modification to the control which is available is manual override by the machine tool operator. The machine tool operator can, of course, vary the feedrate of the machine tool in the event that tool chatter or undue heating is observed.

SUMMARY

Briefly, there is provided a control system for use with a machine tool to effect control thereof in which information necessary for cutting each linear segment is calculated by the control computer from data supplied by a special APT postprocessor and stored in a secondary store as for instance, on an associated disc storage member. The information for each segment includes the four possible non-null "command words" for cutting the segment as well as data which indicates the feed rates along the various axes. The command words provide the digital pulse trains in the form of bit patterns, a 1 bit always indicating a motion of one machine resolution along the appropriate axis. The interpolation process is performed by the central processing unit. During the interpolation process a register associated with each axis servo is incremented with a number based on the velocity and distance to be moved. The program logic selects the appropriate command word to be loaded into the core storage output buffer tables based upon the pattern of register overflows.

An external demand oscillator is used and its frequency is set such that if each command word in the output buffer tables contains a one bit for each axis in the same bit position then the machine tool slides will move at their maximum velocity. The pulses from the demand oscillator are applied to an output channel of the computer and trigger the channel to read the next desired command word from an output buffer table in the core storage unit and store it in the output register of the channel where it is available to the transmission control unit. The transmission control unit then transmits the interpolation data from the output register to the machine tool servos.

DESCRIPTION OF THE PREFERRED EMBODIMENT

Figures 1, 2:
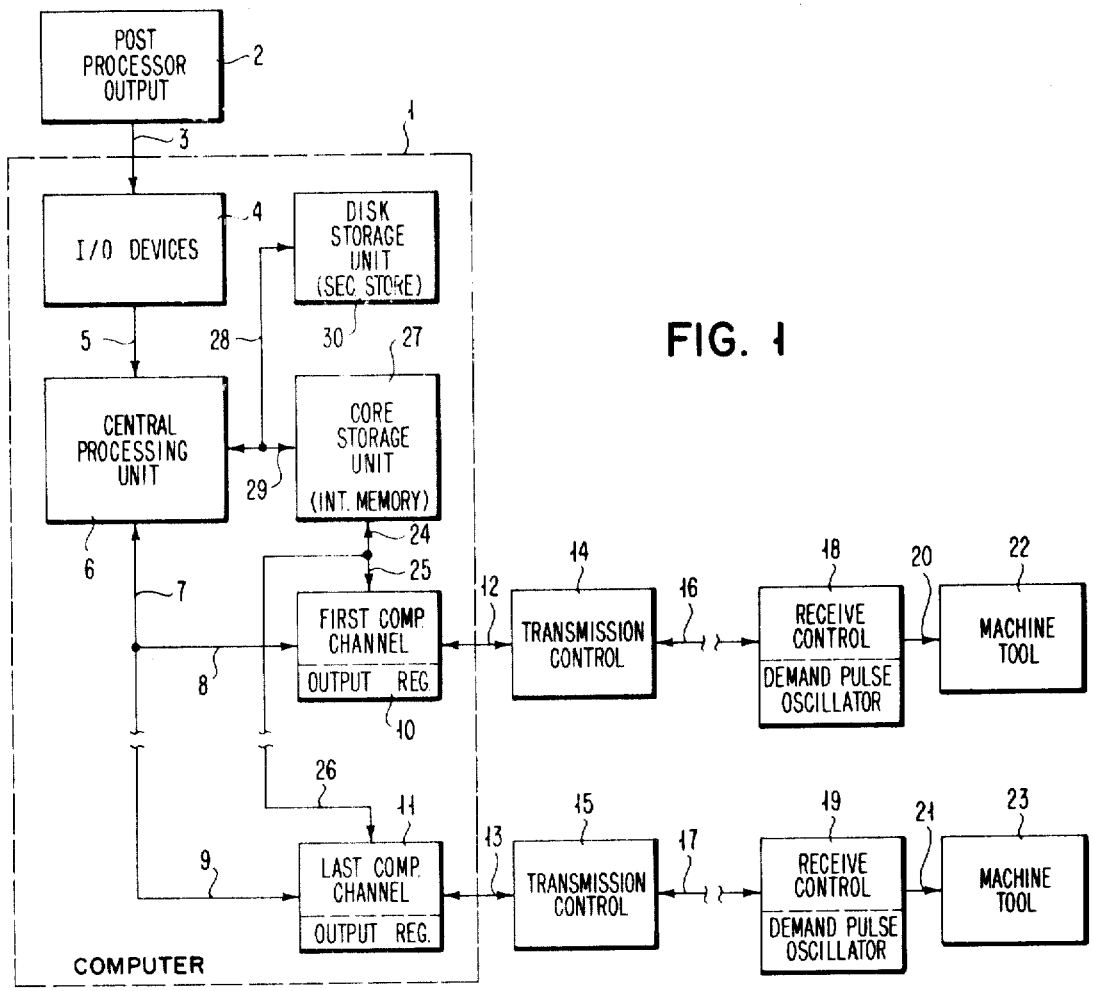
FIG. 1 is an overall block diagram illustrative of the subject novel control approach.
FIG. 2 is a table illustrative of the linear interpolation process utilized in the subject system to generate command words which can be gated out of core by means of the external oscillator control approach.

To drive the machine tool in real time the computer must provide a command to the servo of each slide indicating either one increment of movement in the positive direction, one increment of movement in the negative direction or no movement at all. The computer provides this information in the form of a command word in which two bit positions are reserved for each axis of the machine tool. A one, or command bit, in the leftmost of these two positions will command a movement of one increment in the negative direction, while a one in the rightmost position will command a movement of the associated slide one increment in the positive direction. A zero in both positions indicates that no motion is commanded, while command bits in both positions are illegal.

The resolution of the machine tool is the distance a slide moves upon receiving one electrical pulse to the servo. In the following description, a resolution of the 0.001 inch will be assumed.

The procedure for a part programmer using the subject system is very similar to that for a conventional numerically controlled machine tool. The part programmer describes the part to be cut and how it is to be cut by writing a computer program in the Automatic Programmed Tool (APT) language. This program is processed by an APT processor on a large computer to produce a cutter location tape (CL tape).

The CL tape gives the absolute coordinates of the location of the centerline of the cutting tool, as well as feed rate and some other miscellaneous data. The CL tape contains information that is appropriate and necessary for cutting the described part with any numerically controlled machine tool. In a conventional numerically controlled system another computer program, called a postprocessor, would use the CL tape as input and produce a punched tape designed for a particular machine tool as output. This punched tape, which has the format required for a particular director and a particular machine tool, would then drive this director so that it would control the machine tool to cut the part. In the subject system a special APT postprocessor produces a magnetic tape or a deck of punched cards as input to the controlling computer.

Unlike the conventional system above-described which uses an APT program with its associated programming language and numerical control processor, the subject system is not restricted to a particular programming language or processor for producing the CL tape. The controlling computer (DNC Computer) need not be as powerful a machine in terms of speed and memory capacity as normally needed for an APT processor which produces data for three-dimensional cutting.

In FIG. 1 is shown in block form the direct numerical control computer (DNC Computer), such as the IBM 1800 Computer System with peripheral devices as described in the following manuals: "1800 Function Characteristics Manual," IBM, Form No. A26-5918; "1800 Assembly Language Manual," IBM, Form No. C26-5882, 1956; "1800 Fortran Language Manual," IBM, Form No. C26-3715, 1956; "1800 TSX Manual (Time Sharing Executive)," IBM, 1956. The computer 1 may be a general purpose, digital computer with an internally stored program to control the performance of its components or a hardwired configuration 1 which includes a central processing unit 6, such as the IBM 1802 described in "1800 Function Characteristics Manual" referenced above which performs the arithmetic and control functions of the computer; the I/O (Input/Output) devices 4 such as card readers, magnetic tape units, printers and typewriter terminals, such as those described in "1800 Function Characteristics Manual" as referenced above, a disc storage unit 30, such as in the "1800 Function Characteristics Manual" referenced above, for use as a secondary store; the core storage unit 27, such as that used in the IBM 1800 as described in the "1800 Function Characteristics Manual" referenced above, which is the internal memory unit; and finally, the computer channels 10 and 11, such as the computer channel used in the IBM 1800 which is specifically described in "Manual for RPQ C01-451, 2, 3, 4, 5" and "Channel Multiplexer for 1800," IBM, Form No. L26-2103, 1956. Each of the channels 10 and 11 can read from and write into the core storage unit asynchronously with the operation of the central processing unit on a cycle steal basis. It should be understood that a channel comprises that portion of a modern high-speed computer which operates to make the working of the computer independent of the slower speeds of the input/output (I/O) equipment, whose operation and functions are more fully explained in "Computer Programming Fundamentals," by Herbert D. Leeds and Gerald M. Weinberg, McGraw Hill, 1961, pages 141— 143 and 150— 158. The DNC computer is operated in a time-sharing mode so that multiple machine tools can be controlled, simultaneously.

As shown in FIG. 1, the postprocessor output 2 is applied along line 3 to the I/O devices 4 of the computer 1. The post processor output to computer comprises conventional computer output data, on any of various media and formats, from a general purpose computer system processing an automatic machine tool program, to be used for control of numerical control applications. An example of such a program is the IBM APT program and the "APT Part Programming" as outlined by IIT Research Institute, McGraw Hill, 1967, page 21- —28. As above indicated, the postprocessor output may be in the form of cards or magnetic tape such as that provided by the General Electric GECENT. The output is converted in the I/O devices 4 into electrical signals of suitable level for use by the central processing unit 6 and these electrical signals are applied along line 5 to the CPU 6. Associated with the CPU 6 along line 28 is a disc storage unit 30 and along line 29 is a core storage unit 27. These are conventional units connected in a conventional manner to the CPU. The core storage unit 27 is connected along lines 24 and 25 to a channel 10, and along lines 24 and 26 to a channel 11. The channels 10 and 11 are operative to bring the contents of selected areas of the core storage unit 27 into their output registers. A channel 10 is connected along lines 7 and 8 to the CPU 6 and channel 11 is connected along lines 7 and 9 to the CPU 6. As illustrated in FIG. 1, there may be one or a number of channels. As will hereinafter become apparent, a channel is required for each machine tool to be controlled. The operation of the CPU 6 and channels 10 and 11 to bring the contents of selected areas of the core storage unit 27 into the output registers of the channels is conventional. A more complete description of this operation can be found for instance, in the IBM publications A26-5921, A26-5920 and A26-5918. Channel 10 is connected along line 12 to a transmission control unit 14 which in turn is connected along line 16 to a receive control unit 18. The receive control unit 18 is connected along line 20 to the machine tool 22 examples of the type machine tools 22 that may be controlled include the Sunstrand Omni Mill and the Gordon 230 Tape Master. Likewise, channel 11 is connected along line 13 to a transmission control unit 15 which is connected along transmission lines 17 to a receive control unit 19. The receive control unit 19 is connected along line 21 to the machine control unit 23. An example of the receiver control unit is the IBM 2701 as described in "IBM 2701 Parallel Data Adapter," IBM, Form No. A22-6844, 1964.

The transmission control units 14 and 15 perform two functions. First, they transmit pulses from the demand pulse oscillator of the receive control units to the channels to cause new words to be entered into the output register of the channels. Additionally, they amplify and shape the words received from the output register for transmission to the receive control units. An example of the transmission control unit would be the transmission control unit used in the IBM 360 as described in "IBM System 360 I/O from Interface Channel to Control Unit," IBM, Form No. A23-6843, 1964. It should be understood that the desired information read by the transmission control unit is in fact the command word. The suitable form for transmission being whatever is required for a selected transmission system, such as a digitally encoded electrical signal for an electrical communication line. Again, the sequential entering of words from the core storage unit 27 into the channels under control of an externally generated pulse is well-known and is described in the above-referenced manuals. Briefly, the operation is as follows. Each channel has two registers. The first register, a word count register, will be loaded by the CPU with the number of words which the channel will read from core storage. A second register, the channel address register, will be loaded by the CPU with the first address in core storage that is to be read from core into the 1/0 register. The pulses from the oscillator which are applied to each channel are used to gate the address in the channel address register into the memory address register (not shown) of the core storage unit. Each time that the address from the channel address register is entered into the memory address register, the word count counter register is counted down and the address contained in the channel address register incremented (or decremented). When the word count register has been counted down to zero, any further transfer of the contents of the channel address register to the memory address register is inhibited. The CPU must then load a new address into the channel address register and a new count into the word count counter. Alternatively, a chaining process can be used which results in the automatic loading of these two registers without processor intervention.

In operation, a loading routine causes the central processing unit 6 to read the output data of the postprocessor, perform tests, issue diagnostics if errors are discovered, and make calculations to produce data in a format convenient for real-time interpolation. The formatted data is then stored on the disc storage unit 30. When the cutting begins, an interpolation technique, which will hereinafter be described in detail, is performed by the DNC computer 1 under the control of an interpolation program, using the records from disc storage 30 to produce a sequence of command words which are stored in several output buffer tables i the core storage unit 27 of the computer. The size and number of these output buffer tables is determined by the type of computer channels available and the maximum feed rate of the machine tool. Usually two or three output buffer tables will suffice, with each table containing enough command words to operate the machine tool for approximately 1 second.

For purposes of illustration the operation of channel 10 to control the machine tool 22 will be described. It should be understood that the operation of all other channels and their associated machine tools is identical. The computer channel 10, operating asynchronously with the central processing unit 6 of the computer, reads the command words from the output buffer table in the core storage unit 27 and sends them to the output register. The output register stores exactly one command word and this command word is read by the transmission control unit 14. The channel 10 reads one command word from core storage each time it receives a signal through the transmission control unit 14 from the demand pulse oscillator of the receive-control unit 18. As shown, this oscillator is located in the receive-control unit adjacent the machine tool. Alternatively, the demand pulse oscillator could be located at the transmission control unit 14; but more positive control is exercised by locating this unit near the machine tool.

There are a number of ways that the transmission control unit can transmit the information from the output register of the computer channel 10 to the machine tool servos. The simplest method is to provide two parallel transmission lines for each servo axis, one for positive pulses and one for negative pulses. For a three-axis machine this would require six parallel lines—seven if a parity line is desired. The transmission control unit 14 reads the desired information from the command word stored in the output register of the computer channel 10 and sends it over the transmission lines 16 in a form suitably powered for transmission. The receive-control unit 18 receives the signals, filters out noise and checks the signals received for parity and validity. The receiver control unit 18 may use any well-known signal filtering technique to filter out the noise. Examples of references being "Communication Networks," by E. A. Guillemin, John Wiley and Sons, 1955, and "Passive Network Synthesis," by James E. Storer, McGraw Hill, 1957. The checking of signal received for parity and validity may be accomplished by any suitable data error checking technique such as that described in "Digital Computer Technology and Design," by Willis H. Ware, John Wiley, 1953, page 12.42 ff. A valid command group will be sent to the servosystem of the machine tools. Invalid signals will be replaced by resampling the received signal levels. The error checking above indicates whether the command is valid or invalid and conventional logic design is employed to provide circuits to respond to the indication to send the valid command or resample if invalid. Resampling will continue until a valid signal is stored in the receive-control register. Conventional logic design is employed to provide circuits to respond to the indication to send the valid command or resample if invalid. An interrupt is returned to the DNC Computer in the event that repetitive resampling fails to deliver a valid command group. An interrupt being a conventional signal generated by conventional circuitry such as that described in Ware, referenced above, at pages 13.44 ff. The conventional logic design utilized can be that basic logic design taught in such texts as "Logic Design of Digital Computers," by Montgomery Phister, Jr., John Wiley, 1959, or "The Logic Design of Transistor Digital Computers," by Gerald A. Maley and John Earle, Prentice-Hall Incorporated, 1963. The DNC computer can then either take corrective action such as retransmitting the command word, or can halt operations so that the problem can be diagnosed. The receive control units will not be described in detail since conventional odd parity checking is used and the validity check to sense the occurrence of two 1's in the bit positions of an axis is done in a straight forward manner by AND gates.

The demand pulse oscillator is set at such a frequency that the pulse train transmitted by the transmission control unit will case the slides of the associated machine tool to move at the maximum feed rate in the event that there are one bits in the allowable bit positions of each of the command words which are read from core storage by the channel. The utilization of the external oscillator is a valuable part of the subject system since it relieves the computer of the burden of generating internal timing. Additionally, it provides a convenient vehicle for varying the feed rate or aborting the cut, if necessary. Normally, however, in the absence of adaptive control or an unforeseen problem, the frequency of the oscillator remains fixed.

To produce the required command words, the CPU must be provided with the information necessary to generate the required pulse train. Suppose, for example, that the computer is provided with the displacements $\Delta x$, $\Delta y$ and $\Delta z$ of a line segment to be cut (in units of machine tool resolution) and with the fraction of the maximum vector feedrate which is desired along each axis $V_x, V_y$ and $V_z$. In this case $V_x$ is 1.0 if, and only if, the maximum rate is desired along the x-axis while cutting the segment which would demand that a one bit be generated for this axis in each command word. If $V_x$ is 0.5, then every other command word would have a one bit for that axis and a zero bit in the intermediate words for that axis. If the $V$'s are scaled as fixed-point fractions (if $V$ is 1.0, it will be approximated by a computer word consisting of all ones) and a separate register is set up for each axis, then, if the corresponding $V$ is added to the register for each axis on each interpolation cycle, an overflow will occur when a one is required in the command word for that axis. A test would then be made for overflow after each addition cycle and the occurrence of an overflow would cause a one bit to be stored in the command word in the location in core for the appropriate axis and for the proper direction. The absence of an overflow would cause a zero bit to be generated. In either case, the remainder is stored for use in the next cycle. When an overflow is generated, the computer program must also check to see whether the corresponding segment is completed. For example, if $\Delta x$ is 20, then when 20 overflows have been recorded for the x-register, the segment will have been completed.

The above briefly described technique will provide an effective way for a computer to drive a machine tool. However, it entails an unnecessary number of additions to the registers and thus ties up the central processing unit of the DNC computer more than is required. The following interpolation technique provides a more simple and efficient method of generating the sequence of command words to be stored in core. In this technique instead of incrementing all of the registers each interpolation cycle, only the register associated with the axis which is to move the greatest distance during cutting of a line segment is incremented. This will hereinafter be referred to as the major axis. For this axis the computer program is furnished the same value as before, i.e., the fraction of maximum feedrate desired for this axis. In the following description, this value will be referred to not as $V$, but as $Q_{maj}$. The $Q$ value for any other axis is the ratio of the displacement of that axis to that along with the major axis. Thus, if $\Delta x=100$, $\Delta y=50$, and $\Delta z=25$ and the desired velocity component along the x-axis is 30 inches per minute for a machine tool with a maximum vector feedrate of 60 inches per minute, then $$Q_x = .50, \; Q_y = \frac{\Delta y}{\Delta x} = .50$$

and $$Q_z = \frac{\Delta z}{\Delta x} = .25$$

Each of these $Q$ values will be used to increment their associated registers.

In the drawings hardware registers have not been shown since it is preferable to use the registers in the central processing unit in a conventional manner.

Refer next to FIG. 2 which shows a brief illustration of the subject interpolation technique. In the table of FIG. 2, $\Delta x=100$, $\Delta y=50$ and $\Delta z=25$, and the desired feedrate over the maximum feedrate along the major axis is 0.5 as above discussed. In step 1, the $Q$ value of the major axis, i.e., the $x$-axis, is added to its associated register. This value is 0.50 and will not result in an overflow, thus zero bits are entered into the $x$-bit positions of the command word location. Additionally, since no overflow resulted in the major axis register, the registers associated with the $y$ and $z$ axes are not incremented and zero bits are entered into their bit positions in the first command word. In step 2, the value $Q_x=0.50$ is again entered into the $x$-register and an overflow occurs. Since $\Delta x$ is positive, a one is entered into the rightmost bit location of the second command word in core. Since the register associated with the major axis has overflowed, each of the other axis registers is incremented with its respective $Q$ value. The $y$-register therefore is incremented by 0.50 and the $z$-register is incremented by 0.25. However, since they do not overflow, zeros are entered into their bit positions in the second command word. In step 3, the $x$-register is again incremented by 0.50, but since it did not overflow, zeros are entered into the $x$-bit position of the third command word and the $y$ and $z$ registers again are not incremented and zeros are entered into their bit positions. During the fourth step the $x$-register again overflows and therefore a one is entered into the positive $x$-bit position of the fourth command word and the other two registers are incremented. Addition of 0.50 to the $y$-register results in an overflow and, therefore, since $\Delta y$ is positive, a one bit is entered into the rightmost $y$-axis bit position and the $z$-register is incremented by 0.25 such that it then holds a sum of 0.50. Since it did not overflow, zeros are entered into the $z$-axis bit positions. The above process is repeated and from a consideration of the table of FIG. 2, it can be seen that with the eighth step all three registers will overflow and, therefore, ones will be entered into all of the axis locations of the eighth command work.

The above-described scheme as actually executed is slightly modified because no $Q$ value can be exactly 1.0, but rather must be the numerical value of the binary fraction with as many ones as there are binary digits in a computer word, and accordingly, the registers must be initialized so that overflow will occur on every cycle if the maximum rate is commanded for a particular axis. In addition, as above described, it would be very time consuming for the computer to actually pack the required zeros and ones into a command word each cycle. Instead each record for cutting a segment, which is stored on a disc file, contains sample command words of all types (except null words) required in cutting the segment. A selection of the proper one of these is made based upon the result of the overflow.

In summary, an external demand oscillator is used for each machine tool and its frequency is set such that if a one is stored in the same bit position of each command word in the output buffer tables of core storage, the machine tool slide for the corresponding axis will move at its maximum velocity. The pulses from the demand oscillator are applied to the computer channel to demand that the next command word in core storage be read out and passed to the output register. The transmission control unit then transmits the necessary information from the command word to the receive control unit and thence to the machine tool servos. When an output buffer table of command words has been emptied, the channel proceeds to the next table of command words, simultaneously sending an interrupt to the central processing unit. This interrupt will signal the interpolation routine to refill the command word buffer that has just been emptied.

It will be appreciated by those skilled in the art that while one technique of interpolation was described, other techniques are available. Also, in the following claims the expression machine tool is intended to include not only conventional machine tools, but additionally, is intended to include any mechanism which is capable of multiple axis movement such as plotters and drafting machines.

While the invention has been particularly shown and described with reference to a preferred embodiment thereof, it will be understood by those skilled in the art that various changes in the form and detail may be made therein without departing from the spirit and scope of the invention.

We claim:

1. A system for providing a pulse train in the form of a series of command words comprising a plurality of data bit positions appearing in a channel output register to command each axis servo of a machine tool to effect movement of the slides of said machine tool along the respective axes of said slides, from input data, said command words indicative of the length and velocity that each slide is to move along its respective axes during the cutting of increments forming a segment, said system comprising:

a digital computer including a core storage unit and including a channel, said channel including said channel output register for storing one of said command words;

said digital computer receptive of said input data and having means to generate a series of said command words and to store said command words in output buffer tables in said core storage unit;

each of said command words, so generated by said digital computer, containing thereby command bits for each slide in ones of said bit positions in accordance with whether the command word is to effect movement of each slide; and means external of said digital computer for causing said command words to be entered into said channel output register.

2. The system of claim 1 wherein said compute includes a central processing unit to control the arithmetic and control function of said computer and said channel is, independent of the action of the central processing unit, operable to transfer command words from said output buffer tables of said core storage unit into said channel output register under the control of said external means.

3. The system of claim 2 wherein said external means is an oscillator which causes said channel to read a new command word from said output buffer tables in the core storage unit, and the frequency of said oscillator is a predetermined frequency, said frequency having been predetermined, based upon he inherent characteristic of the particular machine tool being utilized, such that if each of said command words commands movement of all said slides, said slides will move at their maximum velocity.

4. The system of claim 3 wherein said oscillator is of the variable frequency type and may be set to said predetermined frequency.

5. The system of claim 2 wherein said central processing unit is programmed to selectively enter records from a secondary store into said core storage output buffer tables to generate a sequence of command words in response to said input data which specifies the distance and velocity that each of said slides is to move during the cutting of increments forming a segment.

6. The system of claim 3 wherein said central processing unit is programmed to selectively enter records from a secondary store into said core storage output buffer tables to generate a sequency of command words in response to said input data which specifies the distance and velocity that each of said slides is to move during the cutting of increments forming a segment.

7. The system of claim 2 in which each of said command words so generated contains two bit positions for each axis servo, wherein a one bit in one of said bit positions causes the respective axes servo to generate a positive movement along its respective axis ad a one bit in the other bit position causes the respective axis servo to generate a negative movement therealong.

8. The system of claim 7 in which said central processing unit is programmed to employ a separate register thereof to represent each said axis, and said central processing unit is also programmed to enter a one bit into the proper bit location of each command word, depending on the direction to be moved, for each axis in response to an overflow signal each time that incrementation of said employed register by said central processing unit, which is programmed therefor, with a number based on the distance and velocity to be moved from said input data results in said overflow signal therefrom.

9. The system of claim 8 in which said central processing unit is programmed to increment the one of said employed registers representing the major axis, which is the one of said axes that is to move the greatest distance during the cutting of a segment, with a number $Q_{maj}$ calculated thereby as follows:

$$Q_{maj.} = \frac{\text{command feedrate}}{\text{maximum feedrate}}$$

and to increment the others of said employed registers with a number $Q_{min}$ calculated thereby as follows:

$$Q_{min.} = \frac{\text{distance to be moved by axis slide associated with said channel output registers}}{\text{distance major axis slide is to move}}$$

and said other registers are incremented thereby only if said major axis register overflows, wherein:

said commanded feedrate, said maximum feedrate, and the distances to be moved for each said axis slide, all comprise digital data comprising said input data.